US012667899B2

(12) United States Patent
Wang et al.

(10) Patent No.: US 12,667,899 B2
(45) Date of Patent: Jun. 30, 2026

(54) REVOLVING CATHODE TOOL AND METHOD FOR CO-ROTATING ELECTROCHEMICAL MACHINING OF INNER WALL OF AERO-ENGINE CASING

(71) Applicant: Nanjing University of Aeronautics and Astronautics, Jiangsu (CN)

(72) Inventors: Dengyong Wang, Jiangsu (CN); Shuofang Zhou, Jiangsu (CN); Di Zhu, Jiangsu (CN); Wenjian Cao, Jiangsu (CN); Jun Zhang, Jiangsu (CN); Zengwei Zhu, Jiangsu (CN)

(73) Assignee: NANJING UNIVERSITY OF AERONAUTICS AND ASTRONAUTICS, Jiangsu (CN)

( * ) Notice: Subject to any disclaimer, the term of this patent is extended or adjusted under 35 U.S.C. 154(b) by 520 days.

(21) Appl. No.: 18/221,622

(22) Filed: Jul. 13, 2023

(65) Prior Publication Data

US 2025/0018485 A1     Jan. 16, 2025

(30) Foreign Application Priority Data

May 18, 2022     (CN) .......................... 202210543273.5

(51) Int. Cl.
*B23H 3/04*            (2006.01)
(52) U.S. Cl.
CPC ........... *B23H 3/04* (2013.01); *B23H 2400/10* (2013.01)
(58) Field of Classification Search
CPC ............................... B23H 3/04; B23H 2400/10
See application file for complete search history.

(56) References Cited

FOREIGN PATENT DOCUMENTS

| | | | | | |
|---|---|---|---|---|---|
| CN | 105522239 A | * | 4/2016 | ............... | B23H 3/04 |
| CN | 108788345 A | * | 11/2018 | ............... | B23H 3/04 |
| CN | 110605444 A | * | 12/2019 | ............... | B23H 3/04 |

OTHER PUBLICATIONS

Machine translation of CN 105522239 of Zhu (Year: 2016).*
Machine translation of CN 108788845 of Wang (Year: 2018).*
Machine translation of CN 110605444 of Wang (Year: 2019).*

* cited by examiner

*Primary Examiner* — Brian W Cohen
(74) *Attorney, Agent, or Firm* — Terry M. Sanks, Esq.; Beusse Sanks, PLLC

(57)            ABSTRACT

A revolving cathode tool and method for co-rotating electrochemical machining of an inner wall of an aero-engine casing are provided, and relates to the technical field of electrochemical machining. The co-rotating electrochemical machining revolving cathode tool comprises a power supply, a cathode shaft, an anode workpiece and a flexible cathode assembly. The cathode shaft is electrically connected with a cathode of the power supply. The anode workpiece is electrically connected with an anode of the power supply. One end of the cathode shaft is connected with the flexible cathode assembly. The problem that a non-array complex structure of the inner wall of the aero-engine casing cannot be machined through counter-rotating electrochemical machining is fundamentally solved. The diameter of the cathode tool is 1/n of the diameter of the anode workpiece.

14 Claims, 3 Drawing Sheets

REVOLVING CATHODE TOOL AND METHOD FOR CO-ROTATING ELECTROCHEMICAL MACHINING OF INNER WALL OF AERO-ENGINE CASING

TECHNICAL FIELD

The present disclosure relates to the technical field of electrochemical machining, in particular to a revolving cathode tool and method for co-rotating electrochemical machining of an inner wall of an acro-engine casing.

BACKGROUND

Electrochemical machining is based on the principle of electrochemical anodic dissolution to realize efficient removal of materials. Compared with traditional machining methods, electrochemical machining is non-contact machining, and has the advantages of no tool loss, no residual stress, no cold work hardening, no plastic deformation, low surface roughness and the like during machining. Therefore, electrochemical machining is suitable for machining thin-walled parts, complex curved surfaces in space, and difficult-to-cut titanium alloy and high-temperature alloy materials.

As the most important part of an acro-engine, the aero-engine casing plays a key role in the performance of the engine. The aero-engine casing is a large-scale revolving thin-walled part, usually has a wall thickness of 2 to 3 mm and even less than 1 mm in some parts, and is made of difficult-to-machine materials, so that the aero-engine casing is the part with the most complicated shape and structure and the highest difficulty in machining the aero-engine. In actual production, traditional computer numerical control milling is a main method for machining aero-engine casing parts. The method is complicated in machining procedures, long in machining cycle, high in tool consumption and high in machining cost. According to the structural characteristics of the aero-engine casing parts, Nanjing University of Aeronautics and Astronautics proposed a novel electrochemical machining method for a thin-walled aero-engine casing (the application number is 201410547093.X, the applicant is Nanjing University of Aeronautics and Astronautics, the inventors are Zhu Di, Zhu Zengwei, Wang Hongrui and Wang Dengyong), that is, counter-rotating electrochemical machining technology. In the process of co-rotating electrochemical machining, a revolving cathode tool is used, and a whole molded surface can be machined without changing the electrode. The machined surface is smooth and continuous, without "water mark" or "gear mark". The material is gradually and evenly etched in the co-rotating process, and is good in wall thickness uniformity and free of machining deformation.

During the electrochemical machining of an inner wall structure of the aero-engine casing, the diameter of the cathode tool can only be smaller than the inner diameter of an anode workpiece. Aiming at the outer wall array structure, a multi-rotating-speed counter-rotating electrochemical machining method can be adopted, and was firstly proposed by Nanjing University of Aeronautics and Astronautics (the application is 202011336134.2, the applicant is Nanjing University of Aeronautics and Astronautics, the inventors are Zhu Zengwei, Wang Dengyong, Zhu Di, Zhang Jun and Ge Yongcheng). The method can machine outer surface array structures of large-size workpieces by using small-diameter cathodes. For a non-array structure on the inner surface of the large-sized revolving workpiece, the conventional counter-rotating electrochemical machining cathode cannot be machined, so it is necessary to design a new cathode tool, and one-time efficient machining of the non-array structure on the inner wall of the aero-engine casing can be realized.

SUMMARY

The present disclosure aims at overcoming the problem that the conventional revolving cathode tool for an inner wall of an acro-engine casing with a non-array complex structure cannot be machined, and provides a revolving cathode tool and method for co-rotating electrochemical machining of an inner wall of an acro-engine casing. One-time efficient machining and forming of a large-size revolving part with a complex surface structure can be realized by using a small-sized cathode tool.

In order to achieve the purpose, the present disclosure provides the following scheme.

The present disclosure provides a revolving cathode tool for co-rotating electrochemical machining of an inner wall of an acro-engine casing, including a power supply, a cathode shaft, an anode workpiece and a flexible cathode assembly. The cathode shaft is electrically connected with a cathode of the power supply, and the anode workpiece is electrically connected with an anode of the power supply. One end of the cathode shaft is connected with the flexible cathode assembly. An insulated window and a conductive sliding block are arranged on a side wall of the flexible cathode assembly. The insulated window is matched in shape with convex structures in array distribution on an inner wall of the anode workpiece, and the conductive sliding block is matched in shape with convex structures in non-array distribution on the inner wall of the anode workpiece. The outer side of the conductive sliding block is flush with an outer side wall of the flexible cathode assembly.

Optionally, the flexible cathode assembly includes a cathode body. The cathode body is of an annular structure. The insulated window is a penetrating port in a side wall of the annular structure. The cathode body is internally provided with a positioning upright post, and an elastic mechanism is provided between the positioning upright post and the conductive sliding block.

Optionally, the elastic mechanism includes a spring. A flexible window is provided on an outer side wall of the cathode body. The shape of the flexible window is matched with that of the conductive sliding block. The side wall of the cathode body communicates with the flexible window through a through hole. The inner side of the conductive sliding block penetrates through the through hole and is connected with one end of the spring. Another end of the spring is connected with a side wall of the positioning upright post.

Optionally, a stop nut is provided on the inner side of the conductive sliding block, and the radial size of the stop nut is larger than the diameter of the through hole.

Optionally, an upper end of the cathode body is provided with a cathode upper cover plate, and a lower end of the cathode body is provided with a cathode lower cover plate. One end of the cathode shaft is connected with the cathode upper cover plate.

Optionally, an end of the non-array distributed convex structure is provided with an insulating sheet.

Optionally, the insulating sheet is made of a high-strength insulating material, and the insulating sheet has a thickness of 0.1 mm to 2 mm.

The present disclosure also provides a method based on the revolving cathode tool for co-rotating electrochemical machining of an inner wall of an acro-engine casing, including the following steps:

during the machining process, connecting the a flexible cathode assembly with the cathode of a power supply, connecting the anode workpiece with the anode of the power supply, and applying machining voltage. The anode workpiece rotates at a certain angular velocity, and a cathode shaft rotates in a same direction at a velocity which is n times of the angular velocity of the anode workpiece and is fed along a radial direction;

attaching insulating sheet to the surface of a non-array distributed convex structure on the surface of the anode workpiece in advance, and moving the flexible cathode assembly relative to the anode workpiece. When a conductive sliding block is in contact with the insulating sheet at a corresponding position, an elastic mechanism is compressed, and the conductive sliding block moves to the inside of a flexible window. At this time, a machining current only exists in areas on two sides of the non-array distributed convex structure, so that a convex structure is generated;

moving the flexible cathode assembly relative to the anode workpiece. When the conductive sliding block corresponding to the surface of the anode workpiece is not attached with an insulating sheet, the conductive sliding block does not generate a reciprocating motion to keep flush with an outer circular surface of a cathode body. A machining current exists in an area where an insulating sheet is not attached, so that the anode workpiece is uniformly corroded, leaving no convex structure.

Compared with the prior art, the present disclosure has the following technical effects.

Firstly, the problem that a non-array complex structure of the inner wall of the aero-engine casing cannot be machined through counter-rotating electrochemical machining is fundamentally solved.

Secondly, the diameter of the cathode tool is 1/n of the diameter of the anode workpiece, the manufacturing period of the cathode tool is shortened, the manufacturing cost of the cathode tool is reduced, and one-time efficient machining forming of a large-sized revolving part with a non-array complex surface structure can be achieved through the small-sized cathode tool.

Thirdly, the universality of the cathode tool is improved. When the position of the convex structure on the surface of the anode workpiece is changed, only the attaching position of the insulating sheet needs to be adjusted, and the cathode tool has good economical efficiency and practical application value.

BRIEF DESCRIPTION OF THE DRAWINGS

To more clearly illustrate the present embodiment of the present disclosure or the technical scheme in the prior art, the following briefly introduces the attached figures to be used in the present embodiment. Apparently, the attached figures in the following description show merely some embodiments of the present disclosure, and those skilled in the art may still derive other drawings from these attached figures without creative efforts.

Figure 1:
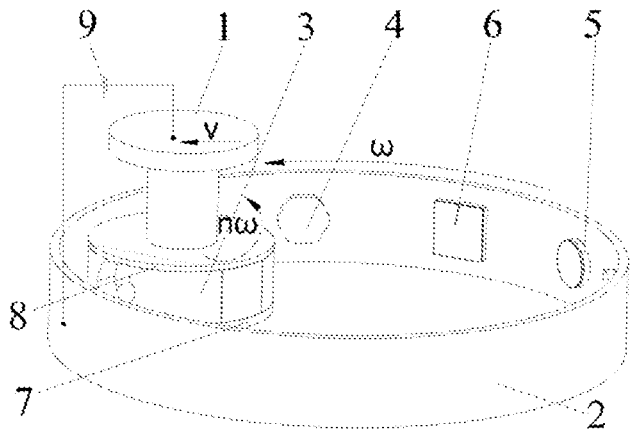
FIG. 1 is a system diagram of a flexible revolving cathode tool for co-rotating electrochemical machining of an inner wall of an aero-engine casing with convex structures.
Figure 2:
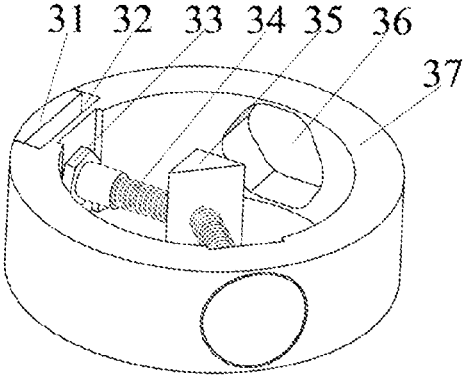
FIG. 2 is a schematic diagram of a flexible cathode assembly.

REFERENCE SIGNS 1, cathode shaft; 2, anode workpiece; 3, flexible cathode assembly; 4, convex structure in array distribution; 5, convex structure in non-array distribution; 6, insulating sheet; 7, cathode lower cover plate; 8, cathode upper cover plate; 9, power supply; 10, area where insulating sheet is not attached; 31, conductive sliding block; 32, flexible window; 33, stop nut; 34, elastic mechanism; 35, positioning upright post; 36, insulated window; and 37, cathode body.

DETAILED DESCRIPTION OF THE EMBODIMENTS

The following clearly and completely describes the technical scheme in the present embodiments of the present disclosure with reference to the attached figures in the present embodiments of the present disclosure. Apparently, the described embodiments are merely a part rather than all of the present embodiments of the present disclosure. Based on the embodiment in the present disclosure, all other embodiments obtained by the ordinary technical staff in the art under the premise of without contributing creative labor belong to the scope protected by the present disclosure.

Embodiment I

As shown in FIG. 1 to FIG. 5, the embodiment provides a revolving cathode tool for co-rotating electrochemical machining of an inner wall of an aero-engine casing. The co-rotating electrochemical machining revolving cathode tool includes a power supply 9, a cathode shaft 1, an anode workpiece 2 and a flexible cathode assembly 3. The cathode shaft 1 is electrically connected with a cathode of the power supply 9, and the anode workpiece 2 is electrically connected with an anode of the power supply 9. One end of the cathode shaft 1 is connected with the flexible cathode assembly 3. An insulated window 36 and a conductive sliding block 31 are provided on a side wall of the flexible cathode assembly 3. The insulated window 36 is matched in shape with convex structures in array distribution 4 on an inner wall of the anode workpiece 2, and the conductive sliding block 31 is matched in shape with convex structures in non-array distribution 5 on the inner wall of the anode workpiece 2. The outer side of the conductive sliding block 31 is flush with an outer side wall of the flexible cathode assembly 3.

In the specific embodiment, the flexible cathode assembly 3 includes a cathode body 37. The cathode body 37 is of an annular structure. The insulated window 36 is a through port in a side wall of the annular structure. The cathode body 37 is internally provided with a positioning upright post 35, and an elastic mechanism 34 is provided between positioning upright post 35 are conductive sliding block 31. The elastic mechanism 34 includes a spring. A flexible window 32 is provided on an outer side wall of the cathode body 37. The shape of the flexible window 32 is matched with that of the conductive sliding block 31. The side wall of the cathode body 37 communicates with the flexible window 32 through a through hole. The inner side of the conductive sliding block 31 penetrates through the through hole and then is connected with one end of the spring. The other end of the spring is connected with a side wall of the positioning upright post 35. A stop nut 33 is provided on the inner side of the conductive sliding block 31, and the radial size of the stop nut 33 is larger than the diameter of the through hole. An upper end of the cathode body 37 is provided with a cathode upper cover plate 8, and a lower end of the cathode body 37 is provided with a cathode lower cover plate 7. One end of the cathode shaft 1 is connected with the cathode upper cover plate 8. An end of the convex structure in non-array distribution 5 is provided with an insulating sheet 6. The insulating sheet 6 is made of a high-strength insulating material, such as PEEK (PolyEther Ether Ketone), and the insulating sheet 6 has a thickness of 1 mm.

In a more specific embodiment, a circular flexible window 32, a square flexible window 32 and a hexagonal insulated window 36 are provided on the side wall of the cathode body 37. The circular flexible window 32 is provided with a cylindrical conductive sliding block 31, and the square flexible window 32 is provided with a square conductive sliding block 31. By adjusting the stop nut 33, outer ends of the cylindrical conductive sliding block 31 and the square conductive sliding block 31 are flush with the outer side wall of the cathode body 37.

Figure 3:
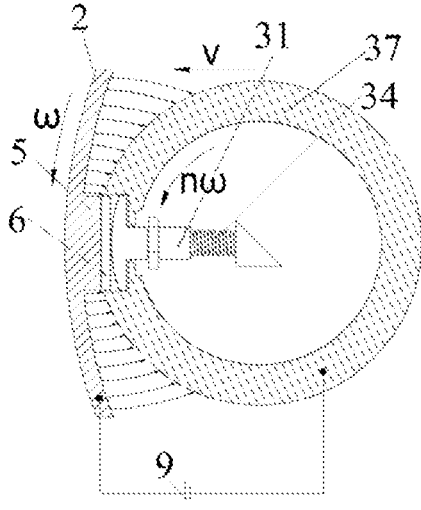
FIG. 3 is a machining diagram when an insulating sheet is attached to the surface of an anode workpiece.

As shown in FIG. 3, a machining voltage U of 30 V is applied. The flexible cathode assembly 3 moves relative to the anode workpiece 2. When a conductive sliding block 31 is in contact with the insulating sheet 6 at a corresponding position, an elastic mechanism 34 is compressed, and the conductive sliding block 31 moves to the inside of a flexible window 32 so as to form a window. A machining current only exists in areas on two sides of the convex structure in non-array distribution 5.

Figure 4:
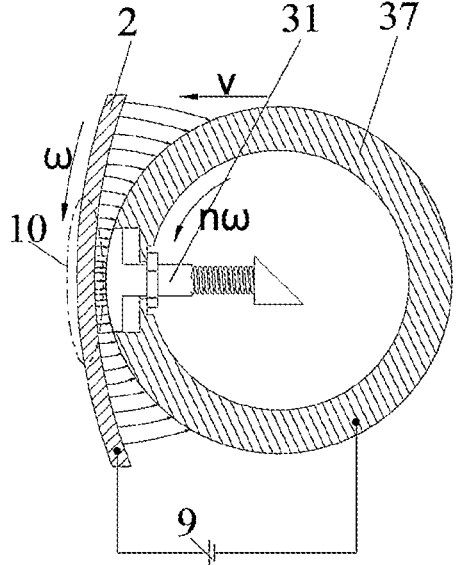
FIG. 4 is a machining diagram when an insulating sheet is not attached to the surface of an anode workpiece.

As shown in FIG. 4, a machining voltage U of 30 V is applied. The flexible cathode assembly 3 moves relative to the anode workpiece 2. When the conductive sliding block 31 corresponding to the surface of the anode workpiece 2 is not attached with an insulating sheet 6, the conductive sliding block 31 does not generate a reciprocating motion to keep flush with an outer circular surface of a cathode body 37. A uniform machining current exists in an area 10 where an insulating sheet is not attached, so that the anode workpiece 2 is uniformly corroded, and leaving no convex structure.

Figure 5:
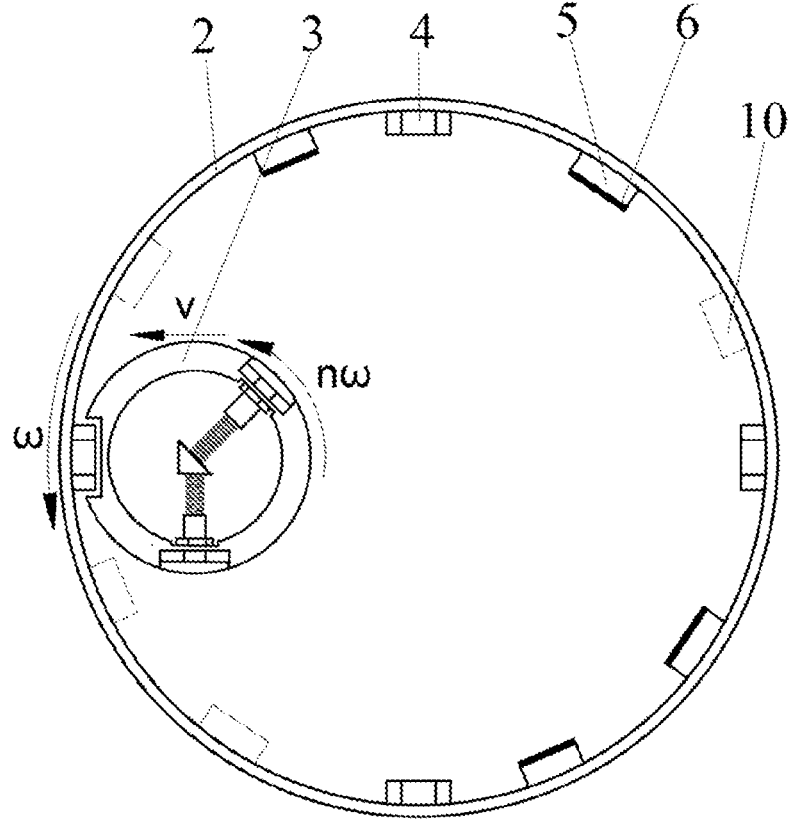
FIG. 5 is a top view of a flexible revolving cathode tool system for co-rotating electrochemical machining of an inner wall of an aero-engine casing with convex structures.

As shown in FIG. 5, the convex structures in array distribution 4 are evenly distributed on the inner wall of the anode workpiece 2 at intervals of 90 degrees. The anode material near the area 10 where an insulating sheet is not attached is uniformly corrode, leaving no convex structure. A hexagonal convex structure is formed at the corresponding position of the insulating window 36.

Embodiment II

The present disclosure also provides a method based on the revolving cathode tool for co-rotating electrochemical machining of an inner wall of an aero-engine casing, including the following process.

During the machining process, a flexible cathode assembly 3 is connected with a cathode of a power supply 9, an anode workpiece 2 is connected with an anode of the power supply 9, and machining voltage is applied. The anode workpiece 2 rotates at a certain angular velocity, and a cathode shaft 1 rotates in a same direction at a velocity which is n times of the angular velocity of the anode workpiece 2 and is fed along the radial direction.

The array distributed convex structure on the surface of the anode workpiece 2 is directly generated by the insulated window 36 under the relative movement of the anode workpiece 2 and the flexible cathode assembly 3.

An insulating sheet 6 is attached to the surface of a non-array distributed convex structure on the surface of the anode workpiece 2 in advance, and the flexible cathode assembly 3 moves relative to the anode workpiece 2. When a conductive sliding block 31 is in contact with the insulating sheet 6 at a corresponding position, an elastic mechanism 34 is compressed, and the conductive sliding block 31 moves to the inside of a flexible window 32. At this time, a machining current only exists in areas on two sides of the convex structure in non-array distribution 5, so that a convex structure is generated.

The flexible cathode assembly 3 moves relative to the anode workpiece 2. When the conductive sliding block 31 corresponding to the surface of the anode workpiece 2 is not attached with an insulating sheet 6, the conductive sliding block 31 does not generate a reciprocating motion to keep flush with an outer circular surface of a cathode body 37. A machining current exists in an area 10 where an insulating sheet is not attached, so that the anode workpiece 2 is uniformly corroded, leaving no convex structure.

It needs to be noted that for those skilled in the art, obviously the present disclosure is not limited to the details of the exemplary embodiment, and the present disclosure can be achieved in other specific forms without departing from the spirit or essential characteristics of the present disclosure. Therefore, for every point, the embodiments should be regarded as exemplary embodiments and are unrestrictive, the scope of the present disclosure is restricted by the claims appended hereto, therefore, all changes, including the meanings and scopes of equivalent elements, of the claims are aimed to be included in the present disclosure, and any mark of attached figures in the claims should not be regarded as limitation to the involved claims.

Specific examples are used for illustration of the principles and implementation methods of the present disclosure. The description of the above-mentioned embodiments is used to help illustrate the method and the core principles of the present disclosure; and meanwhile, those skilled in the art can make various modifications in terms of specific embodiments and scope of application in accordance with the teachings of the present disclosure. In conclusion, the content of this specification shall not be construed as a limitation to the present disclosure.

What is claimed is:

1. An apparatus for electrochemical machining an inner wall of an aero-engine casing, the apparatus comprising:
   a power supply;
   an anode workpiece comprising the aero-engine casing;
   a revolving cathode tool for co-rotating electrochemical machining of the inner wall of the aero-engine casing, the revolving cathode tool comprising a cathode shaft, and a flexible cathode assembly,
   wherein the cathode shaft is electrically connected with a cathode of the power supply, and the anode workpiece is electrically connected with an anode of the power supply;
   one end of the cathode shaft is connected with the flexible cathode assembly;

7 an insulated window and a conductive sliding block are arranged on a side wall of the flexible cathode assembly;

the insulated window is matched in shape with convex structures in array distribution on an inner wall of the anode workpiece, the conductive sliding block is matched in shape with convex structures in non-array distribution on the inner wall of the anode workpiece; and the outer side of the conductive sliding block is flush with an outer side wall of the flexible cathode assembly.

2. The apparatus according to claim 1, wherein the flexible cathode assembly comprises a cathode body; the cathode body is of an annular structure; the insulated window is a penetrating port in a side wall of the annular structure; and the cathode body is internally provided with a positioning upright post, and an elastic mechanism is provided between the positioning upright post and the conductive sliding block.

3. The apparatus according to claim 2, wherein the elastic mechanism comprises a spring, a flexible window is provided on an outer side wall of the cathode body, the shape of the flexible window is matched with that of the conductive sliding block, the side wall of the cathode body communicates with the flexible window through a through hole, the inner side of the conductive sliding block penetrates through the through hole and is connected with one end of the spring, and another end of the spring is connected with a side wall of the positioning upright post.

4. The apparatus according to claim 3, wherein a stop nut is provided on the inner side of the conductive sliding block, and the radial size of the stop nut is larger than the diameter of the through hole.

5. The apparatus according to claim 2, wherein an upper end of the cathode body is provided with a cathode upper cover plate, and a lower end of the cathode body is provided with a cathode lower cover plate; and one end of the cathode shaft is connected with the cathode upper cover plate.

6. The apparatus according to claim 2, wherein an end of the non-array distributed convex structure is provided with an insulating sheet.

7. The apparatus according to claim 6, wherein the insulating sheet is made of a high-strength insulating material, and the insulating sheet has a thickness of 0.1 mm to 2 mm.

8. A method based on the apparatus according to claim 1, comprising the following steps:

during a machining process, connecting the flexible cathode assembly with the cathode of a power supply, connecting the anode workpiece with the anode of the power supply, and applying machining voltage; the anode workpiece rotates at a certain angular velocity, and a cathode shaft rotates in a same direction at a velocity which is n times of the angular velocity of the anode workpiece, and is fed along a radial direction;

attaching an insulating sheet to the surface of a non-array distributed convex structure on the surface of the anode workpiece in advance, and moving the flexible cathode assembly relative to the anode workpiece; when a conductive sliding block is in contact with the insulating sheet at a corresponding position, an elastic mechanism is compressed, and the conductive sliding block moves to the inside of a flexible window; and at this time, a machining current only exists in areas on two sides of the non-array distributed convex structure, so that a convex structure is generated;

moving the flexible cathode assembly relative to the anode workpiece; when the conductive sliding block corresponding to the surface of the anode workpiece is not attached with an insulating sheet, the conductive sliding block does not generate a reciprocating motion to keep flush with an outer circular surface of a cathode body; and a machining current exists in an area where an insulating sheet is not attached, so that the anode workpiece is uniformly corroded, leaving no convex structure.

9. The method based on the apparatus according to claim 2, comprising the following steps:

during a machining process, connecting the flexible cathode assembly with the cathode of a power supply, connecting the anode workpiece with the anode of the power supply, and applying machining voltage; the anode workpiece rotates at a certain angular velocity, and a cathode shaft rotates in a same direction at a velocity which is n times of the angular velocity of the anode workpiece, and is fed along a radial direction;

attaching an insulating sheet to the surface of a non-array distributed convex structure on the surface of the anode workpiece in advance, and moving the flexible cathode assembly relative to the anode workpiece; when a conductive sliding block is in contact with the insulating sheet at a corresponding position, an elastic mechanism is compressed, and the conductive sliding block moves to the inside of a flexible window; and at this time, a machining current only exists in areas on two sides of the non-array distributed convex structure, so that a convex structure is generated;

moving the flexible cathode assembly relative to the anode workpiece; when the conductive sliding block corresponding to the surface of the anode workpiece is not attached with an insulating sheet, the conductive sliding block does not generate a reciprocating motion to keep flush with an outer circular surface of a cathode body; and a machining current exists in an area where an insulating sheet is not attached, so that the anode workpiece is uniformly corroded, leaving no convex structure.

10. The method based on the apparatus according to claim 3, comprising the following steps:

during a machining process, connecting the flexible cathode assembly with the cathode of a power supply, connecting the anode workpiece with the anode of the power supply, and applying machining voltage; the anode workpiece rotates at a certain angular velocity, and a cathode shaft rotates in a same direction at a velocity which is n times of the angular velocity of the anode workpiece, and is fed along a radial direction;

attaching an insulating sheet to the surface of a non-array distributed convex structure on the surface of the anode workpiece in advance, and moving the flexible cathode assembly relative to the anode workpiece; when a conductive sliding block is in contact with the insulating sheet at a corresponding position, an elastic mechanism is compressed, and the conductive sliding block moves to the inside of a flexible window; and at this time, a machining current only exists in areas on two sides of the non-array distributed convex structure, so that a convex structure is generated;

moving the flexible cathode assembly relative to the anode workpiece; when the conductive sliding block corresponding to the surface of the anode workpiece is not attached with an insulating sheet, the conductive sliding block does not generate a reciprocating motion to keep flush with an outer circular surface of a cathode body; and a machining current exists in an area where an insulating sheet is not attached, so that the anode workpiece is uniformly corroded, leaving no convex structure.

11. The method based on the apparatus according to claim 4, comprising the following steps:

during a machining process, connecting the flexible cathode assembly with the cathode of a power supply, connecting the anode workpiece with the anode of the power supply, and applying machining voltage; the anode workpiece rotates at a certain angular velocity, and a cathode shaft rotates in a same direction at a velocity which is n times of the angular velocity of the anode workpiece, and is fed along a radial direction;

attaching an insulating sheet to the surface of a non-array distributed convex structure on the surface of the anode workpiece in advance, and moving the flexible cathode assembly relative to the anode workpiece; when a conductive sliding block is in contact with the insulating sheet at a corresponding position, an elastic mechanism is compressed, and the conductive sliding block moves to the inside of a flexible window; and at this time, a machining current only exists in areas on two sides of the non-array distributed convex structure, so that a convex structure is generated;

moving the flexible cathode assembly relative to the anode workpiece; when the conductive sliding block corresponding to the surface of the anode workpiece is not attached with an insulating sheet, the conductive sliding block does not generate a reciprocating motion to keep flush with an outer circular surface of a cathode body; and a machining current exists in an area where an insulating sheet is not attached, so that the anode workpiece is uniformly corroded, leaving no convex structure.

12. The method based on the apparatus according to claim 5, comprising the following steps:

during a machining process, connecting the flexible cathode assembly with the cathode of a power supply, connecting the anode workpiece with the anode of the power supply, and applying machining voltage; the anode workpiece rotates at a certain angular velocity, and a cathode shaft rotates in a same direction at a velocity which is n times of the angular velocity of the anode workpiece, and is fed along a radial direction;

attaching an insulating sheet to the surface of a non-array distributed convex structure on the surface of the anode workpiece in advance, and moving the flexible cathode assembly relative to the anode workpiece; when a conductive sliding block is in contact with the insulating sheet at a corresponding position, an elastic mechanism is compressed, and the conductive sliding block moves to the inside of a flexible window; and at this time, a machining current only exists in areas on two sides of the non-array distributed convex structure, so that a convex structure is generated;

moving the flexible cathode assembly relative to the anode workpiece; when the conductive sliding block corresponding to the surface of the anode workpiece is not attached with an insulating sheet, the conductive sliding block does not generate a reciprocating motion to keep flush with an outer circular surface of a cathode body; and a machining current exists in an area where an insulating sheet is not attached, so that the anode workpiece is uniformly corroded, leaving no convex structure.

13. The method based on the apparatus according to claim 6, comprising the following steps:

during a machining process, connecting the flexible cathode assembly with the cathode of a power supply, connecting the anode workpiece with the anode of the power supply, and applying machining voltage; the anode workpiece rotates at a certain angular velocity, and a cathode shaft rotates in a same direction at a velocity which is n times of the angular velocity of the anode workpiece, and is fed along a radial direction;

attaching an insulating sheet to the surface of a non-array distributed convex structure on the surface of the anode workpiece in advance, and moving the flexible cathode assembly relative to the anode workpiece; when a conductive sliding block is in contact with the insulating sheet at a corresponding position, an elastic mechanism is compressed, and the conductive sliding block moves to the inside of a flexible window; and at this time, a machining current only exists in areas on two sides of the non-array distributed convex structure, so that a convex structure is generated;

moving the flexible cathode assembly relative to the anode workpiece; when the conductive sliding block corresponding to the surface of the anode workpiece is not attached with an insulating sheet, the conductive sliding block does not generate a reciprocating motion to keep flush with an outer circular surface of a cathode body; and a machining current exists in an area where an insulating sheet is not attached, so that the anode workpiece is uniformly corroded, leaving no convex structure.

14. The method based on the apparatus according to claim 7, comprising the following steps:

during a machining process, connecting the flexible cathode assembly with the cathode of a power supply, connecting the anode workpiece with the anode of the power supply, and applying machining voltage; the anode workpiece rotates at a certain angular velocity, and a cathode shaft rotates in a same direction at a velocity which is n times of the angular velocity of the anode workpiece, and is fed along a radial direction;

attaching an insulating sheet to the surface of a non-array distributed convex structure on the surface of the anode workpiece in advance, and moving the flexible cathode assembly relative to the anode workpiece; when a conductive sliding block is in contact with the insulating sheet at a corresponding position, an elastic mechanism is compressed, and the conductive sliding block moves to the inside of a flexible window; and at this time, a machining current only exists in areas on two sides of the non-array distributed convex structure, so that a convex structure is generated;

moving the flexible cathode assembly relative to the anode workpiece; when the conductive sliding block corresponding to the surface of the anode workpiece is not attached with an insulating sheet, the conductive sliding block does not generate a reciprocating motion to keep flush with an outer circular surface of a cathode body; and a machining current exists in an area where an insulating sheet is not attached, so that the anode workpiece is uniformly corroded, leaving no convex structure.

* * * * *